United States Patent
Hein et al.

(10) Patent No.: US 6,922,966 B2
(45) Date of Patent: Aug. 2, 2005

(54) CONNECTING ELEMENT FOR HOLLOW SECTIONS OF DIFFERENT CROSS-SECTION

(75) Inventors: Jörg Hein, Steisslingen (DE); Martin Feuerstein, Radolfzell (DE); Olaf Gallasch, Singen (DE); Klaus Traub, Pfullendorf (DE)

(73) Assignee: Alcan Technology & Management Ltd., Neuhausen am Rheinfall (NL)

( * ) Notice: Subject to any disclaimer, the term of this patent is extended or adjusted under 35 U.S.C. 154(b) by 121 days.

(21) Appl. No.: 10/058,603

(22) Filed: Jan. 28, 2002

(65) Prior Publication Data

US 2002/0100243 A1 Aug. 1, 2002

(30) Foreign Application Priority Data

Jan. 30, 2001 (DE) ......................................... 101 04 291
May 18, 2001 (DE) ......................................... 101 24 248

(51) Int. Cl.[7] ............................................... E04C 2/40
(52) U.S. Cl. .................... 52/655.1; 52/656.4; 52/656.9; 52/696; 296/203.01; 296/203.03; 296/209
(58) Field of Search ............................. 52/656.4, 656.9, 52/696; 160/381; 296/203.01, 209; 403/3, 170, 171, 233

(56) References Cited

U.S. PATENT DOCUMENTS

| | | | | |
|---|---|---|---|---|
| 3,731,958 A | * | 5/1973 | Offenbroich | 287/189.36 H |
| 3,828,516 A | * | 8/1974 | Kern | 52/758 H |
| 3,893,774 A | * | 7/1975 | Hashioka | 403/171 |
| 4,273,462 A | * | 6/1981 | Fukuchi | 403/171 |
| 4,354,768 A | * | 10/1982 | Witek | 403/3 |
| 4,432,565 A | | 2/1984 | Suzuki et al. | |
| 5,059,056 A | * | 10/1991 | Banthia et al. | 403/170 |
| 5,271,687 A | * | 12/1993 | Holka et al. | 403/233 |
| 5,295,708 A | | 3/1994 | Siga et al. | |
| 5,431,211 A | * | 7/1995 | Guillemet | 160/381 |
| 5,451,115 A | * | 9/1995 | Sayres | 403/171 |
| 5,609,004 A | | 3/1997 | Kreis | |
| 5,931,520 A | | 8/1999 | Seksaria et al. | |
| 6,391,470 B1 | | 5/2002 | Schmieder et al. | |

FOREIGN PATENT DOCUMENTS

| | | |
|---|---|---|
| DE | 29 43 773 | 3/1981 |
| DE | 42 04 826 A1 | 6/1993 |
| DE | 42 32 846 | 3/1994 |
| DE | 197 15 069 A1 | 10/1997 |
| DE | 299 16 467 | 1/2000 |
| DE | 198 45 146 | 4/2000 |
| EP | 0 990 578 A2 | 4/2000 |
| WO | WO 94/10022 | 5/1994 |

* cited by examiner

*Primary Examiner*—Carl D. Friedman
*Assistant Examiner*—Yvonne M. Horton
(74) *Attorney, Agent, or Firm*—Ostrolenk, Faber, Gerb & Soffen, LLP

(57) ABSTRACT

A connecting element for insertion into the ends of at least two hollow sections of different cross-section, in particular in the case of a middle node for an instrument panel transverse beam in automobile manufacture is such that a push-fit body is shape-formed—by way of extrusion of a light weight alloy, plastic or other extrudable material—on a frame with side walls extending in the direction of insertion, the push-fit body is of smaller cross-section than the frame and contains lengths of the frame walls. That frame preferably surrounds the push-fit body which in turn forms a corner of the frame. In addition, the frame may exhibit an integral frame bracket outside one frame side wall whereby the frame bracket walls are aligned with parallel frame walls.

8 Claims, 5 Drawing Sheets

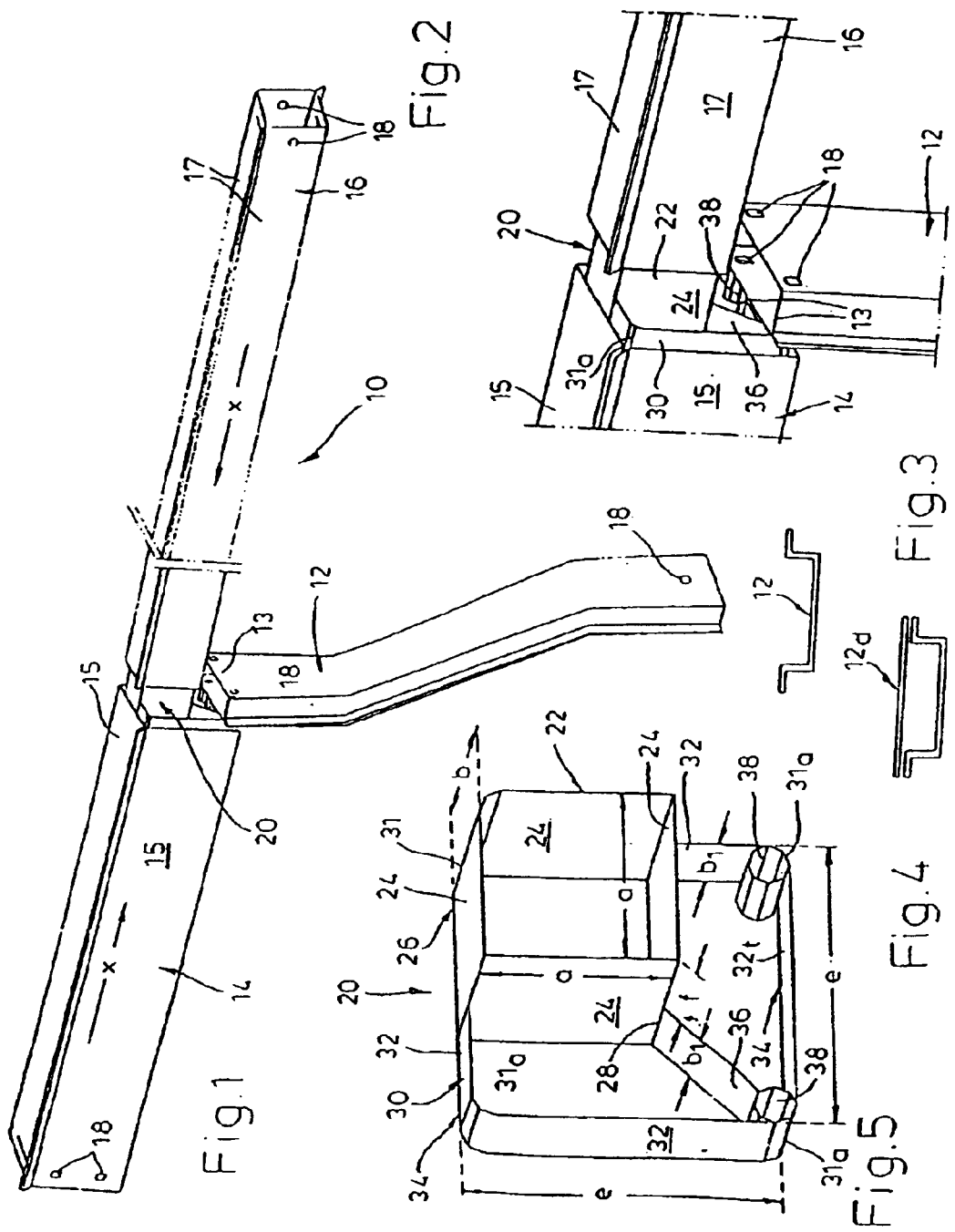

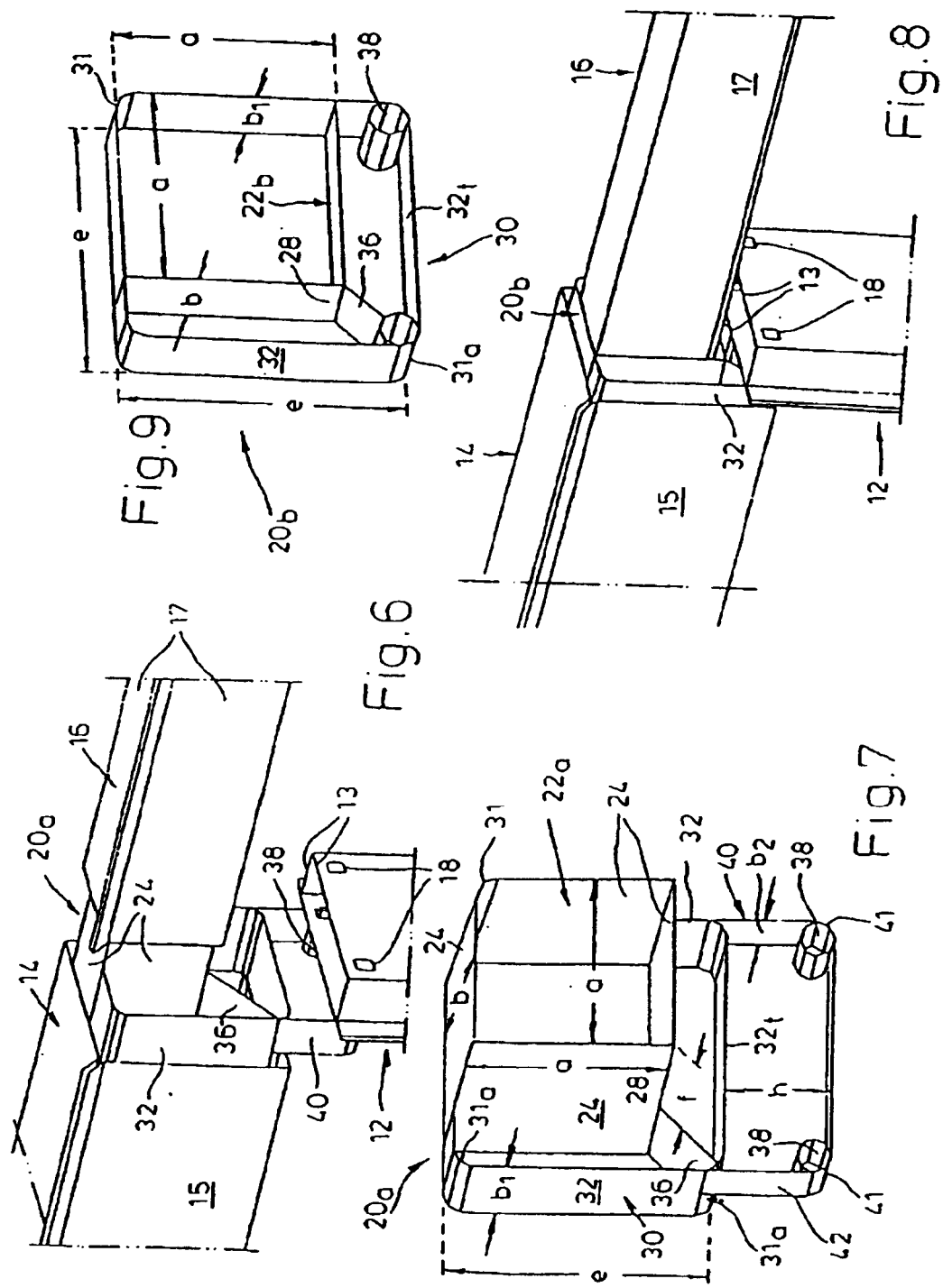

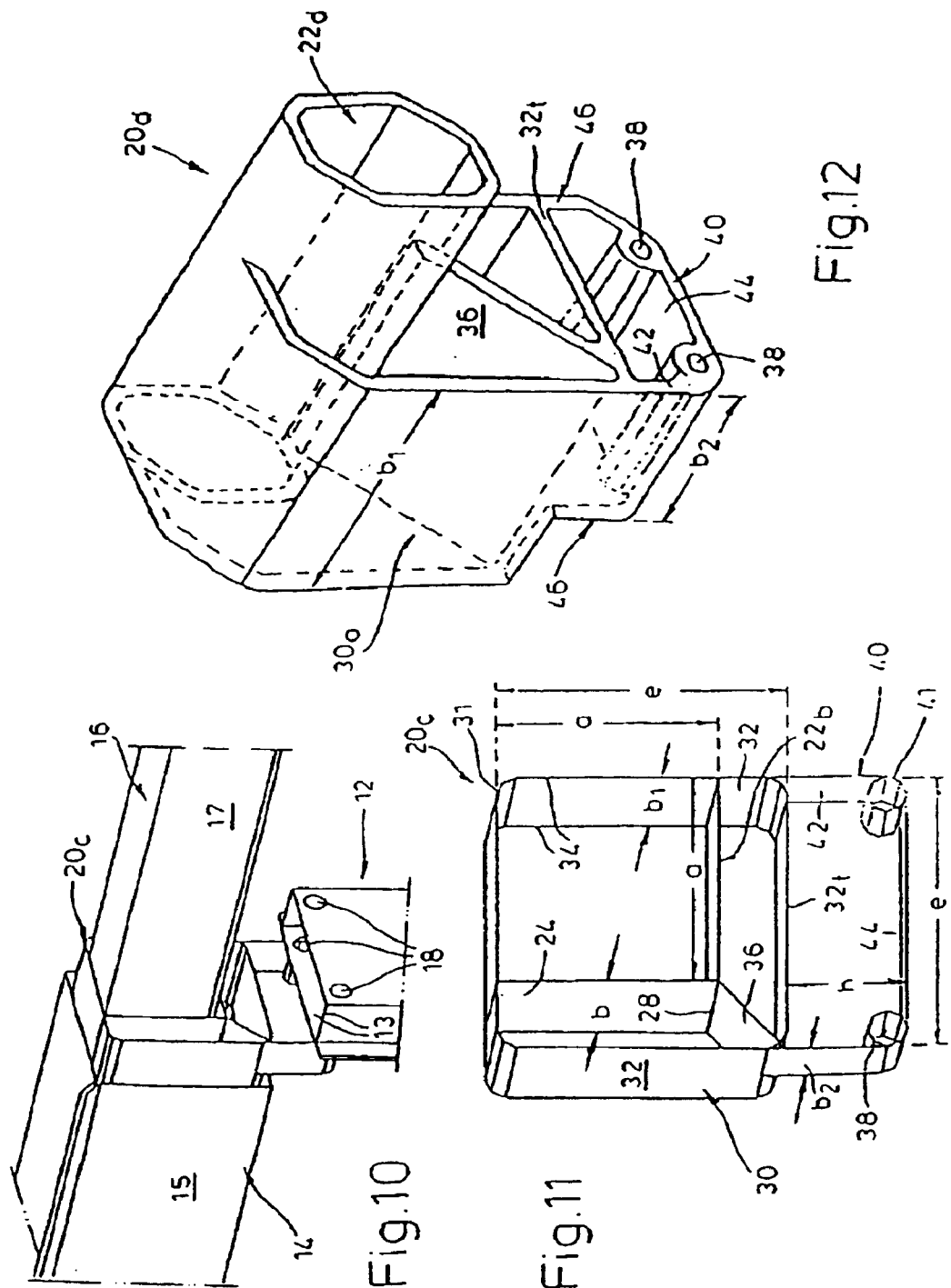

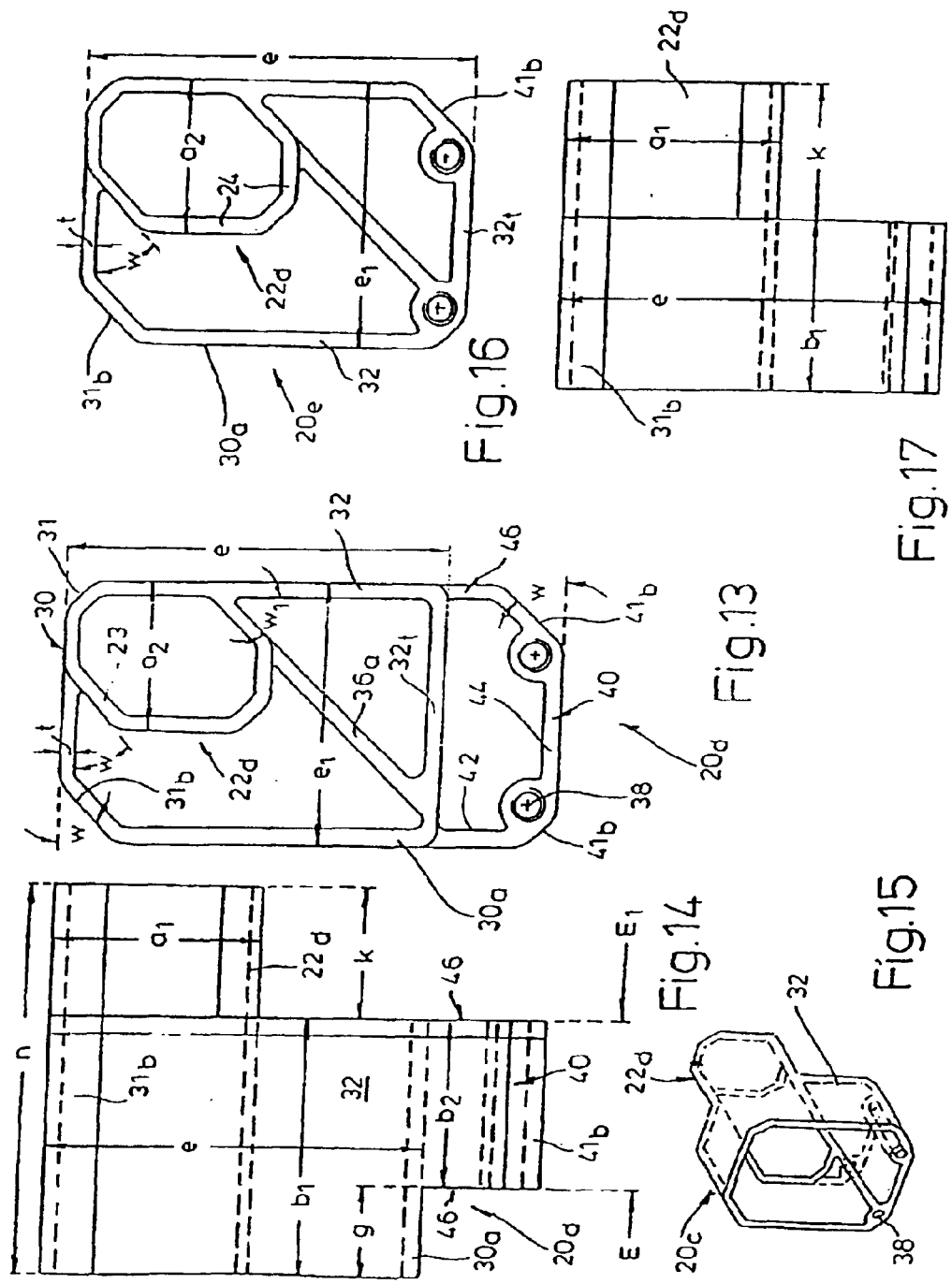

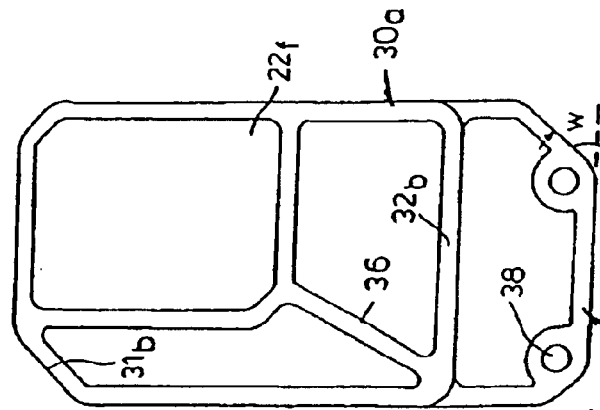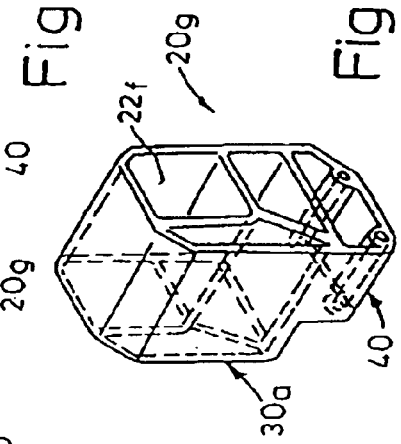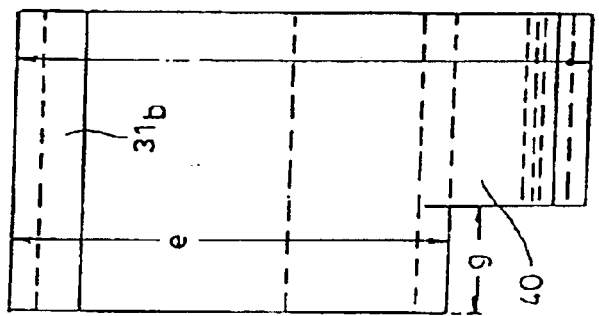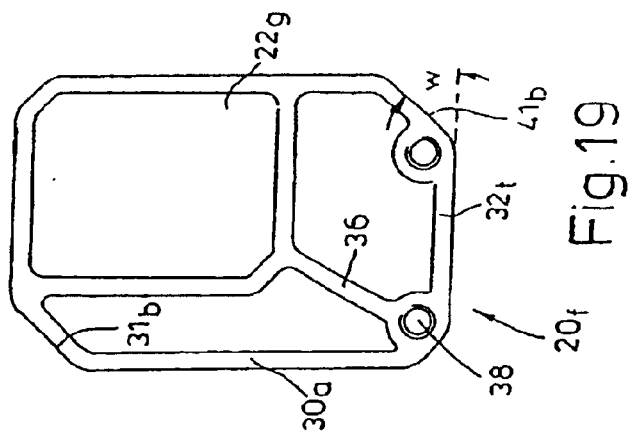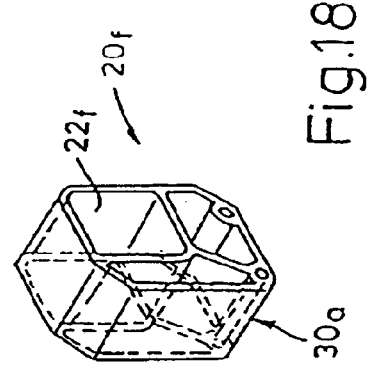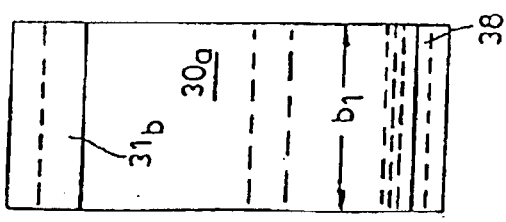

CONNECTING ELEMENT FOR HOLLOW SECTIONS OF DIFFERENT CROSS-SECTION

BACKGROUND OF THE INVENTION

The invention relates to a connecting element for insertion into the ends of at least two hollow sections of different cross-section, in particular a middle node for an instrument panel transverse beam in automobile manufacture.

Such connecting elements or middle nodes for hollow sections—possibly of lengths of dish-shaped parts, preferably half-shell shaped parts—in particular hollow sections of rectangular cross-section are known in the form of die-cast or shaped sheet parts. Such transverse beams are also known as cockpit carriers and are usually T-shaped with a hollow section on the driver side of the middle node and, on the other side, another hollow section for the passenger side. A support beam may also be present, resulting in a T-shaped transverse beam.

The known box-shaped middle nodes—with a middle wall and on both sides an integral rib, in each case forming a cross-section suitable for insertion purposes—are made by die-casting or by shape-forming and stamping sheet material; these require relatively high tooling costs and usually require very time-consuming post-production processing. Furthermore, the middle nodes for left-hand-drive and right-hand-drive vehicles have to be produced in specially designed tools.

SUMMARY OF THE INVENTION

In view of the above, the object of the present invention is to produce a middle node, as mentioned previously, involving low tooling costs and, thereby, to reduce the cost of post-production processing. In addition, efforts are made to be able to produce the middle nodes for left-hand-drive and right-hand-drive vehicles using the same tooling.

That objective is achieved by way of the invention in that a push-fit body is shape-formed —by way of extrusion of light weight metal, plastic or another extrudable material— in a frame, whereby the push-fit body is of smaller cross-section than the frame and parts of the frame form parts of the walls of the push-fit body. To that end it has been found favourable for the frame to surround the push-fit body and the latter preferably to be a corner of the frame.

According to a further detail of the invention an integral frame bracket or frame hoop may be formed on the outside of one side of the frame, the walls of which frame bracket are aligned with the two parallel neighbouring frame walls. In order to facilitate the joining of this middle node e.g. to a supporting arm projecting out of a vehicle tunnel, two sleeves for bolts are provided in opposite lying corners of the frame or frame bracket on the frame, said sleeves likewise being formed in the extrusion process.

Frames and push-fit bodies may form a compact extruded part which is delimited by two parallel planes. However, it has been found favourable to allow at least the push-fit body on one side to project out of the frame which penetrates one of the planes. If an integral frame bracket is provided, the frame may project out of one of its sides and the push-fit body from the other side.

In all the result is a clever means of manufacturing middle nodes for the required field of application which meet the set objectives.

BRIEF DESCRIPTION OF THE DRAWING

FIG. 1: a perspective view of a transverse beam with supporting arm and so called middle node as stiffening element for a private car;

FIG. 2: an enlarged section from FIG. 1;

FIGS. 3, 4: cross-sections through different versions of the support arm;

FIG. 5: an enlarged perspective view of the middle nodes shown in FIGS. 1 and 2;

FIGS. 6, 8, 10: perspective views of three further versions of transverse beams with middle nodes;

FIGS. 7, 9, 11: enlarged perspective views of the middle nodes shown in FIG. 6, 8 and 10;

FIG. 12: a perspective view of another middle node;

FIG. 13: an end view of the middle node shown in FIG. 12;

FIG. 14: a front elevation relating to FIGS. 12 and 13;

FIGS. 15, 18, 21: perspective views of three further designs of middle node;

FIGS. 16, 19, 22: front elevations of the middle nodes shown in FIGS. 15, 18, and 21; and FIGS. 17, 20, 23: end views relating to FIGS. 16, 19 and 22.

DETAILED DESCRIPTION OF THE PREFERRED EMBODIMENTS

A T-shaped transverse beam 10 for installation under the instrument panel of a private car—not shown here—exhibits a middle node 20 as means for connecting a support arm 12, which is vertical when installed, for connection to a support arm 14—at right angles in FIG. 1—for the driver side and a support arm 16 for the passenger side. Such a transverse beam 10 is also known as a cockpit carrier.

The middle node 20 serves the purpose of providing a transition from the driver-side support arm 14, which is in the form of a hollow section and approximately quadratic in cross-section, to the passenger-side arm 16 which is aligned with the support arm 14. The passenger side support arm 16 is only a hollow section, the cross-section of which is likewise quadratic and smaller than that of the other support arm 14. In addition, the thickness of the four sheet walls 17 of the longer support arm 16 is less than the thickness of the walls 15 of the support arm 14 for the driver side. Also the middle node 20 should accommodate this transition in wall thickness onto which the support arms 14, 16 are pushed in direction x.

The support arm 12—serving as support for the vehicle tunnel which is not shown here—features, as shown in FIG. 3, a narrow, open, rectangular, shell-like cross-section and, as $12_d$ in FIG. 4, a double shell-like cross-section and is fitted close to its upper edge 13 with openings 18 for bolts or other connecting elements.

The middle node 20 shown in FIGS. 1, 2 and 5 is in one piece, manufactured by extrusion of a light metal alloy, and exhibits an approximately quadratic push-fit body 22 of height a at the side and breadth b, the outer contour of which corresponds to the inner contour of the narrower support arm 16, with little play; the faces of its walls 24 are oriented in the direction of displacement or insertion x. The push-fit body 22 is integrated in and encompassed by a likewise quadratic frame 30 of about half the breadth $b_1$, and about double the height e such that the push-fit body 22 forms one frame corner 31 and two of the strip-shaped sides 32 run into the aligned body walls 24, whereby one of the wall edges 26—the rear edge in FIG. 5—coincides with the edge 34 of the related frame side 32 i.e. the push-fit body 22 projects out of one side of the frame 30 by a distance f; the latter corresponds approximately to the breadth $b_1$ Provided on the outside, at the free inner corner 28 of the push-fit body 22, is an integral diagonal strip 36 of breadth $b_1$ which runs to the above mentioned neighbouring, diagonally opposite corner $31_a$ of the push-fit body, 22 where an intervening sleeve 38 for a bolt is situated. The corners 31, $31_a$ are rounded. A second sleeve 38 for a bolt is provided in the other corner $31_a$, parallel to and opposite the sleeve 38 connected to the diagonal strip 36; in the installed position both sleeves 38 are aligned with the openings 18 at the upper corners 13 of the support arm 12 to accommodate bolts or connecting elements along with the openings.

In the case of the middle node $20_a$ in FIGS. 6 and 7 the breadth b1 of side 32 is equal to approximately one third of the breadth b of the wall 24. Here, the integral diagonal strip 36 is situated directly in the corner $31_a$; the sleeves 38 for bolts are situated in corners 41 of an additional integral U-like frame bracket 40 of height h to the lower side $32_t$ of the frame. Both parallel side walls 42 of the U-like frame bracket 40 are integrally attached to its base strip 44 and are in line with the side wall strips 32 of the frame 30 and its edge—in FIG. 7—front edge 46 is in line with the front edge 34. The breadth $b_1$ of the frame strip 32 corresponds approximately to double the breadth $b_2$ of the frame bracket 40.

The breadth b of the push-fit body $32_b$ in frame 30 in FIGS. 8 and 9 is the same as its breadth b1; otherwise, this middle node $20_b$ is the same shape as the middle node 20 described above in FIGS. 1–5. Middle node $20_c$ (FIGS. 10, 11) corresponds essentially to middle node $20_b$ in FIGS. 8 and 9 with an additional frame bracket 40 in the design shown in FIG. 7.

Middle node $20_d$ in FIGS. 12 to 14, of overall height e of approx. 115 mm and a transverse dimension $e_1$ of approx. 70 mm, exhibits a wall thickness t of 4 mm. Both a corner $31_b$ of the frame 30 and the diagonal corner 41b of the frame bracket 40 form an angle w of 45°. The same holds for a corner region 23 of push-fit body $22_d$. This is integrally formed on a diagonal strip 36 which here is continuous and makes an angle $w_1$ of 45° with the side wall 32. The overall length n of the middle node $20_d$ corresponds approximately with its side wall e of approx. 100 mm, the outer height $a_1$, of the push-fit body $22_a$, here 55 mm, its breath $a_2$ 40 mm.

As illustrated in particular in FIG. 14, frame 30 projects on one side beyond the outer edge 46 of the frame bracket 40—or beyond the planes E, $E_1$ defined by this—by a distance g of about 24 mm, and on the other side the push-fit body $22_d$ by a distance k of 36 mm.

The middle node $20_e$ in FIGS. 15 to 17 corresponds approximately to middle node $20_d$ without frame bracket 40.

The middle node $20_f$, shown in FIGS. 18 to 20, is approximately the same as the previously described middle node $20_e$, whereby, however, the essentially rectangular push-fit body $22_f$—as view in cross-section—does not project out, its breadth corresponds to the breadth $b_1$ of frame $30_a$.

In FIGS. 21 to 23 the frame bracket 40 is again integrally formed on the frame $30_a$ described in FIGS. 18–20, from which a part of the frame $30_a$ containing the push-fit body $22_a$ projects out a distance g.

What is claimed is:

1. A transverse beam of an automobile instrumental panel, comprising: at least two hollow sections of different cross-section that extend longitudinally along a substantially common axis in a different x; and an extruded connecting element inserted into ends of the hollow sections so as to connect them, the connecting element including a frame with side walls extending in the direction x of insertion and a push-fit body shape-formed by extrusion on the frame so that the frame encompasses the push-fit body, the push fit body having a smaller cross-section than the frame and containing the lengths of the frame side walls, the push-fit body being arranged to project out of one end face of the frame in the direction x so that the connecting element has two different cross-sections in the x direction and so that the hollow sections are respectively slideable on the cross-sections in the direction x for connection.

2. A transverse beam according to claim 1, wherein the push-fit body forms a corner of the frame.

3. A transverse beam according to claim 1, wherein a frame bracket is formed onto the frame on an outer side of the side walls.

4. A transverse beam according to claim 3, wherein the side walls are parallel and the frame bracket has arms on the frame aligned with the parallel side walls of the frame.

5. A transverse beam according to claim 1, and further comprising a sleeve for a bolt at two opposite lying corners within the frame.

6. A transverse beam according to claims 3, and further comprising a sleeve for a bolt at two opposite lying corners in the frame bracket.

7. A transverse beam according to claims 3, wherein the frame is configured to project on one side in the direction of insertion beyond a plane defined by an outer edge of the frame bracket.

8. A transverse beam according to claim 7, wherein on an opposite side of the frame bracket the push-fit body projects beyond a plane defined by the outer edge.

* * * * *